US009569097B2

(12) United States Patent
Ramachandran (10) Patent No.: US 9,569,097 B2
(45) Date of Patent: Feb. 14, 2017

(54) VIDEO STREAMING IN A WEB BROWSER

(75) Inventor: Vivek V. Ramachandran, Redmond, WA (US)

(73) Assignee: Microsoft Technology Licesing, LLC, Redmond, WA (US)

(*) Notice: Subject to any disclaimer, the term of this patent is extended or adjusted under 35 U.S.C. 154(b) by 1109 days.

(21) Appl. No.: 13/309,459

(22) Filed: Dec. 1, 2011

(65) Prior Publication Data

US 2013/0145267 A1     Jun. 6, 2013

(51) Int. Cl.
| G06F 3/0488 | (2013.01) |
| G06F 3/0484 | (2013.01) |
| H04N 21/235 | (2011.01) |
| H04N 21/472 | (2011.01) |

(52) U.S. Cl.
CPC ....... G06F 3/04883 (2013.01); G06F 3/04842 (2013.01); *H04N 21/2355* (2013.01); *H04N 21/472* (2013.01)

(58) Field of Classification Search
CPC .............. G06F 9/44521; G06F 17/3079; G06F 17/30837; G06F 17/2258; G06F 3/04842; G06F 3/04883; H04N 21/2355; H04N 21/4402; H04N 21/472; H04N 21/6125
See application file for complete search history.

(56) References Cited

U.S. PATENT DOCUMENTS

| 6,025,871 | A  | * | 2/2000  | Kantor  | H04N 7/15 348/14.03 |
| 6,760,749 | B1 | * | 7/2004  | Dunlap  | H04N 7/147 348/14.08 |
| 7,313,809 | B1 | * | 12/2007 | Mohan   | G06F 17/30899 386/240 |
| 7,328,449 | B1 | * | 2/2008  | Park    | H04N 5/44508 348/E5.097 |
| 7,716,361 | B2 |   | 5/2010  | Messer  |  |
| 7,788,583 | B1 |   | 8/2010  | Amzallag |  |
| 8,108,899 | B2 | * | 1/2012  | Shoff   | H04N 5/44543 725/51 |
| 9,195,775 | B2 | * | 11/2015 | Al-Shaykh | G06F 17/30905 |
| 2001/0013068 | A1 | * | 8/2001 | Klemets et al. | 709/231 |
| 2002/0129050 | A1 | * | 9/2002 | Gryskiewicz | 707/500.1 |

(Continued)

OTHER PUBLICATIONS

Yahoo! Video Search Adds 'Larger inline play and embedded related videos' features—Retrieved Date: Mar. 30, 2011 http://www.ditii.com/2009/08/27/yahoo-video-search-adds-larger-inline-play-and-embedded-related-videos-features/, 7 pages.

(Continued)

*Primary Examiner* — Shen Shiau
(74) *Attorney, Agent, or Firm* — Judy Yee; Micky Minhas (57) ABSTRACT

A video element of a browser can be moved, resized, etc. independently of the remainder of a browser page. In one embodiment, as the video element is moved, the remainder of the browser page is reformatted so as to change the page's layout. The renderer of the content can have a different video provider sourcing the video element than the remainder of the browser page. As a result, two different content streams can be provided to the renderer in parallel. In another embodiment, the video element can be docked, such as through a flick operation or a drag-and-drop operation. Once docked, the browser page can be scrolled while the docked video element remains at a fixed location relative to an edge of the browser page.

19 Claims, 10 Drawing Sheets

(56) References Cited

U.S. PATENT DOCUMENTS

| | | | |
|---|---|---|---|
| 2007/0136685 A1* | 6/2007 | Bhatla et al. | 715/800 |
| 2008/0005348 A1* | 1/2008 | Kosiba et al. | 709/231 |
| 2008/0165148 A1 | 7/2008 | Williamson | |
| 2008/0220822 A1 | 9/2008 | Park | |
| 2009/0049385 A1* | 2/2009 | Blinnikka | G06F 3/0481 715/719 |
| 2010/0245371 A1* | 9/2010 | Ishii et al. | 345/545 |
| 2011/0087984 A1* | 4/2011 | Jitkoff et al. | 715/769 |
| 2012/0163770 A1* | 6/2012 | Kaiser | H04N 21/44016 386/241 |
| 2013/0191776 A1* | 7/2013 | Harris | H04M 1/72561 715/784 |
| 2014/0325438 A1* | 10/2014 | Choi | G06F 3/0481 715/808 |
| 2015/0033125 A1* | 1/2015 | Kang | G06F 3/0488 715/719 |

OTHER PUBLICATIONS

Movies HTML5 Video Plugin for WordPress—Retrieved Date: Mar. 30, 2011 http://wordpressinfo.com/2010/12/13/movies-html5-video-plugin-for-wordpress/, 4 pages.

How to Play Video on Your iPhone—Retrieved Date: Mar. 30, 2011 http://www.dummies.com/how-to/content/how-to-play-video-on-your-iphone0.html, 2 pages.

Using the 'Touchscreen Content' Section—Retrieved Date: Mar. 30, 2011 http://www.dwuser.com/flashslideshow/v4/help/using_external_wizard/usage_guide/touchscreen_settings.html, 10 pages.

BlackBerry Developers Blog Explains How to Embed Media on Websites for BlackBerry Devices—Retrieved Date: Mar. 30, 2011 http://crackberry.com/blackberry-developers-blog-explains-how-embed-media-websites-blackberry-devices, 5 pages.

HTC Desire S—Retrieved Date: Mar. 30, 2011 http://www.htc.com/www/howto.aspx?id=23166&type=1&p_id=391, 1 page.

* cited by examiner

VIDEO STREAMING IN A WEB BROWSER

FIELD

The present application relates to video streaming, and, particularly, to video streaming in a web browser.

BACKGROUND

With the increasing popularity of streaming audio and video over networks, such as the Internet, there is a need for optimizing data transfer so that the client experience can be maximized. If the data transfer is not optimized, frames can be lost resulting in glitching or pausing of the streamed content.

The term "streaming" is typically used to indicate that the data representing the media is provided by a host computer over a network to a playback device (i.e., a media playback computer implemented as any of a variety of conventional computing devices, such as a desktop PC, a notebook or portable computer, a cellular telephone or other wireless communication device, a personal digital assistant (PDA), a gaming console, etc.) The client computer typically renders the streaming content as it is received from the host, rather than waiting for the entire file to be delivered.

Webpages being viewed using browsers often provide content supplemented with the option for inline video streaming. Thus, a written story (i.e., content) can be supplemented with a video teaser including a play button. If the user selects the teaser, a video plays while the content is being viewed. Typically, if the user continues to scroll the content, the video scrolls off of the viewable area of the user interface. At that point, the video can be heard, but not seen. A user is thereby prevented from watching the video and reading the content, which lessens the overall user experience. On mobile phones, the screen space is too limited to allow the user to view video and content simultaneously. Consequently, selecting the video typically results in a full-screen video mode wherein only video can be viewed, without content.

In typical systems for viewing content, a media engine decodes content from a network and passes the content to a browser engine. The browser engine then serially passes the content to a renderer. The renderer treats written content and video content the same. Thus, scrolling a page of content results in the video being scrolled off the viewable screen area. The system includes multiple layers of buffering that restricts the ability to efficiently render the streaming. As such, mobile devices often lose frames, which can frustrate users.

Enhancements in video streaming in a browser are desirable to maximize the user experience and allow the user to efficiently consume content.

SUMMARY

The present application allows a video element of a browser to be treated separately from other browser content. As a result, the video element can be moved, resized, etc. independently of the remainder of a browser page.

In one embodiment, as the video element is moved, the remainder of the browser page is reformatted so as to change the page's layout. The renderer of the content can have a different video provider sourcing the video element than the remainder of the browser page. As a result, two different content streams can be provided to the renderer in parallel, to allow efficient movement of the video element separate from other content.

In another embodiment, the video element can be docked, such as through a flick operation or a drag-and-drop operation. Once docked, the browser page can be scrolled while the docked video element remains at a fixed location relative to an edge of the browser page. Thus, the docked video element does not scroll while other content on the browser page is scrolled.

In yet another embodiment, the video element can be switched to a full-screen mode through a user request, such as a double tap operation. When the mode is switched, the renderer can switch from receiving two streams of content in parallel to a single stream. The user can then switch back to the previous mode through another user request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Figure 1:
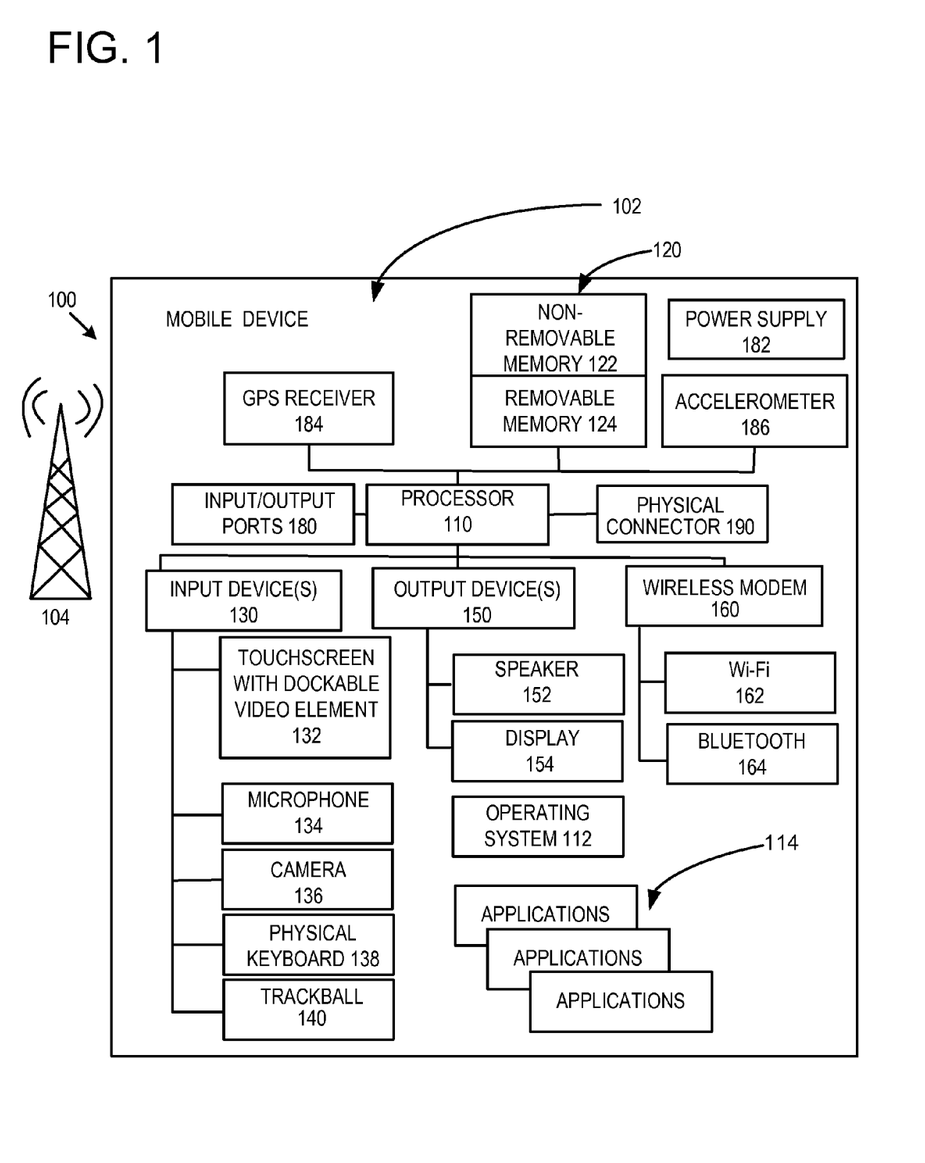
FIG. 1 is an example mobile phone that can be used for streaming video.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The touchscreen 132 can support video streaming to a browser. For example, the touchscreen can support a dockable video element. As further described below, a docked video element typically cannot be scrolled while other content in a browser page can be scrolled.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can be deleted and other components can be added.

Figure 2:
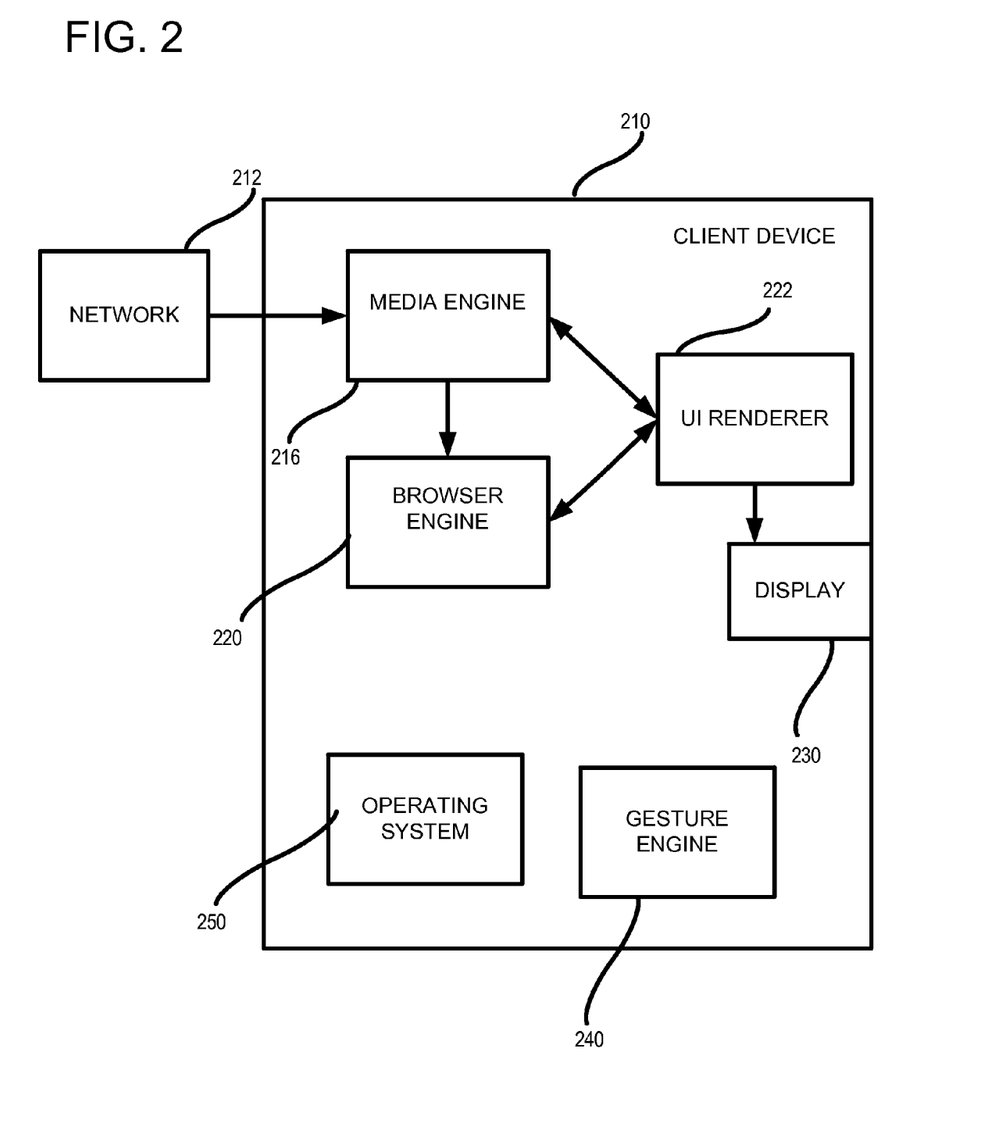
FIG. 2 is a detailed embodiment of a system for streaming video in a browser.

FIG. 2 is a system showing a client device 210, such as a mobile phone, coupled to a network 212. The client device 210 can include a media engine 216 that decodes a media stream from the network 212. The media stream can include video frames, written content, or any other type of content displayable in a browser. The media engine 216 can provide the decoded content to a browser engine 220. A user interface (UI) renderer 222 can be used to display the content on a display 230, which can be a touch screen display. A gesture engine 240 can detect gestures on the display, such as flick gestures and drag gestures. When such gestures are detected, the gesture engine 240 passes the gesture information to the UI renderer 222, either directly or through an operating system 250. The UI renderer and browser engine together form a browser core for displaying content from the network 212.

Content to be displayed on the UI renderer 222 can be sourced from the media engine 216, the browser engine 220, or both. For example, the UI renderer can receive content in parallel from the browser engine 220 and the media engine 216. A video element (not shown) can be displayed on a browser page. The browser engine 220 can mark and reserve a space for the video element on the UI rendering surface. The browser engine 220 can take responsibility of source selection and setting up a video pipeline that acts as a video frame provider. For example, the browser engine can pass control of the video element to the media engine upon selection of the video element. The browser can also notify both the media engine 216 and the UI renderer 222 about the coordinates of the video element on the display. A video-element identification can be passed to both the UI renderer and the media engine so as to sync up the two entities to exchange video frames. The identification allows for multiple video elements to be simultaneously available on the UI renderer and potentially passed frames directly from the media engine, rather than first passing through the browser engine. By passing frames directly from the media engine, an optimum path can be created that reduces the likelihood of dropped frames. The UI renderer 222 receives the video frames from the media engine and renders the frames to the space marked for the video element on the UI rendering surface.

Figure 3:
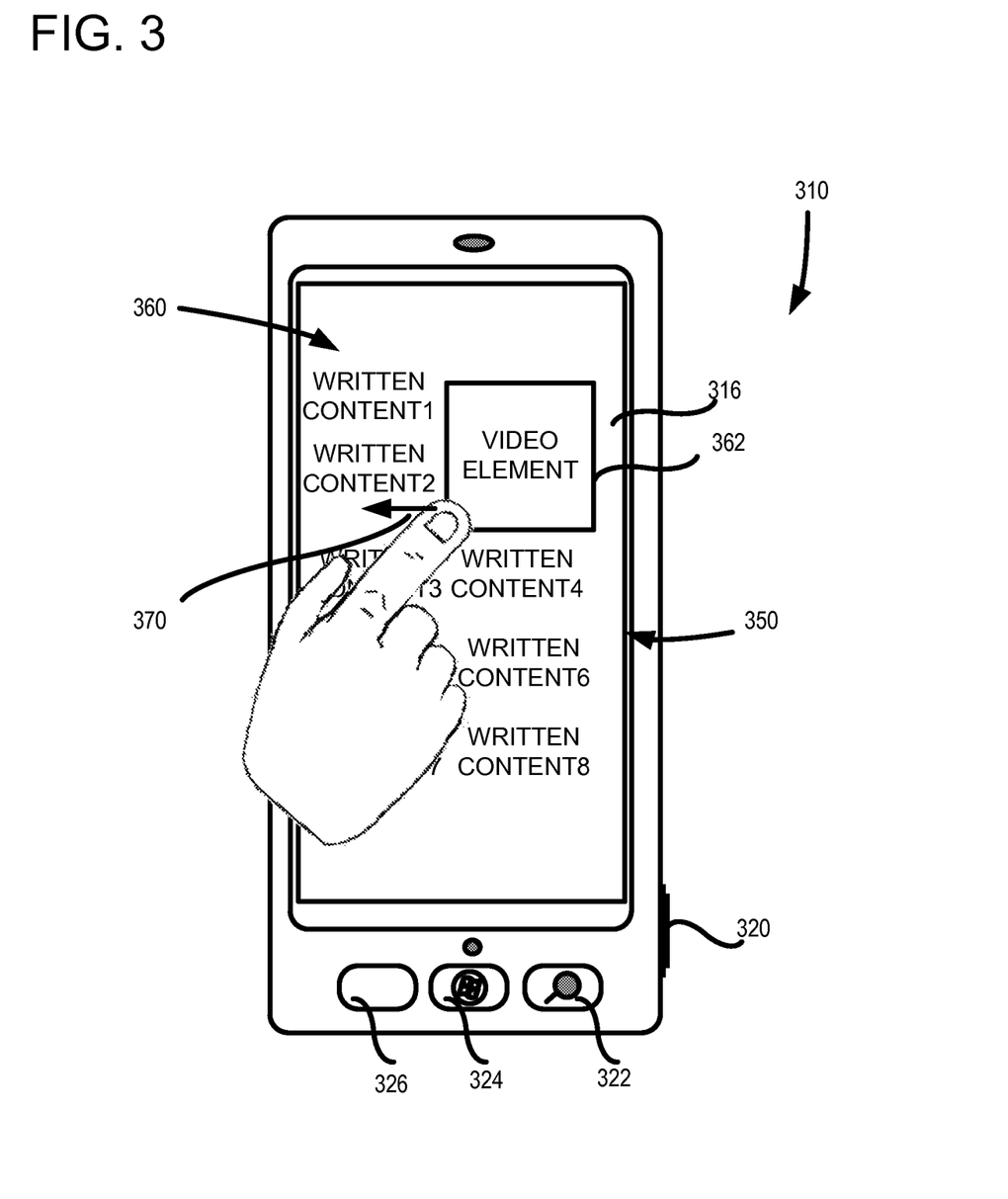
FIG. 3 is an embodiment of a browser page wherein a video element is moveable within the page.

FIG. 3 depicts a front view of an example mobile device 310 displaying a graphical user interface (GUI) on a touch-screen display 316. The mobile device 310 can include several hardware buttons. Exemplary buttons available on many mobile phones can include a camera shutter button 320 located on a side surface of the mobile device, as well as a search button 322, a home button 324, and a back button 326, which can be located on a front surface of the mobile device. These hardware buttons can be used for invoking and/or executing various operations using the mobile device 310. However, these buttons can be eliminated or other buttons can be added. The camera shutter button 320 can be used for invoking and/or executing an image capture application, as well as controlling functions within the image capture application, such as autofocusing and/or operating a camera shutter. Search button 322 can be used to invoke and/or execute a user interface for searching data. Home button 324 can be used for navigating software functionality on the mobile device by, for example, setting the mobile device to a home screen, or invoking other assigned functionality. Back button 326 can be used for navigating software functionality by, for example, requesting a previously requested object that was viewed using the mobile device 310.

A browser page 350 is shown having written content 360 and a video element 362. As described above, a space for the video element can be reserved. For example, two coordinate points can be used for opposing corners in order to identify the space needed for the video element 362. The written content 360 is shown as various sentences labeled "written content 1", "written content 2", etc. having a page layout so as to occupy space not occupied by the video element. A user can provide a user input command, such as a flick gesture, by touching the display 316 and moving their finger in a flicking motion as indicated by arrow 370.

Figure 4:
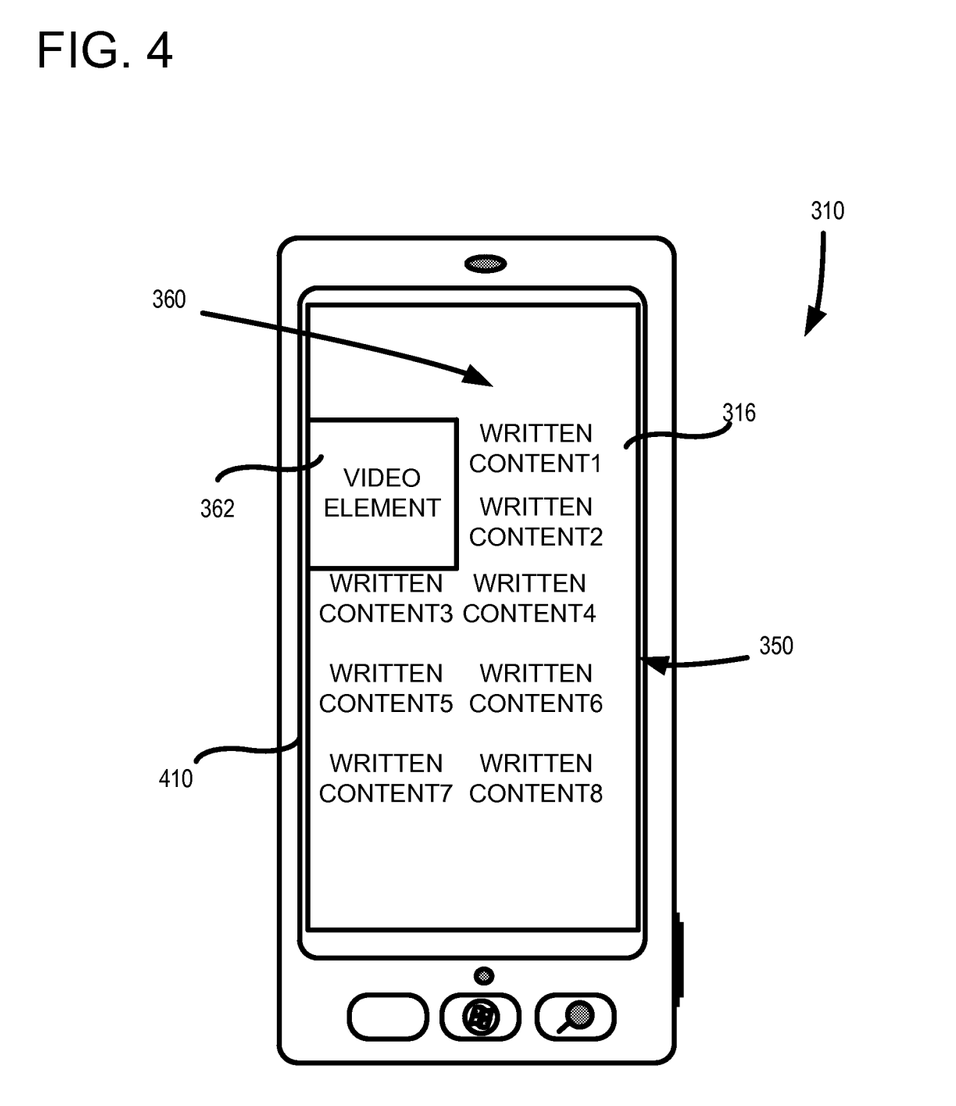
FIG. 4 is an embodiment of a video element docked within a browser page.

FIG. 4 shows an exemplary result of the flick operation of FIG. 3. In FIG. 4, the video element 362 moved from a first location in FIG. 3 to a second location in FIG. 4. In addition, the written content was reformatted to account for the new coordinates of the video element. The new coordinates of the video element 362 are passed to the browser engine, which then reformats the page layout. Another feature is that the video element 362 can be docked to an edge 410 of the browser page. Once docked, the video element is not scrollable like other content in the browser page. For example, FIG. 4 shows the written content 360 prior to the browser page being scrolled. FIG. 4 shows the video element 362 in the docked position, which is determined by its coordinates being within a predetermined threshold distance from an edge of the user interface.

Figure 5:
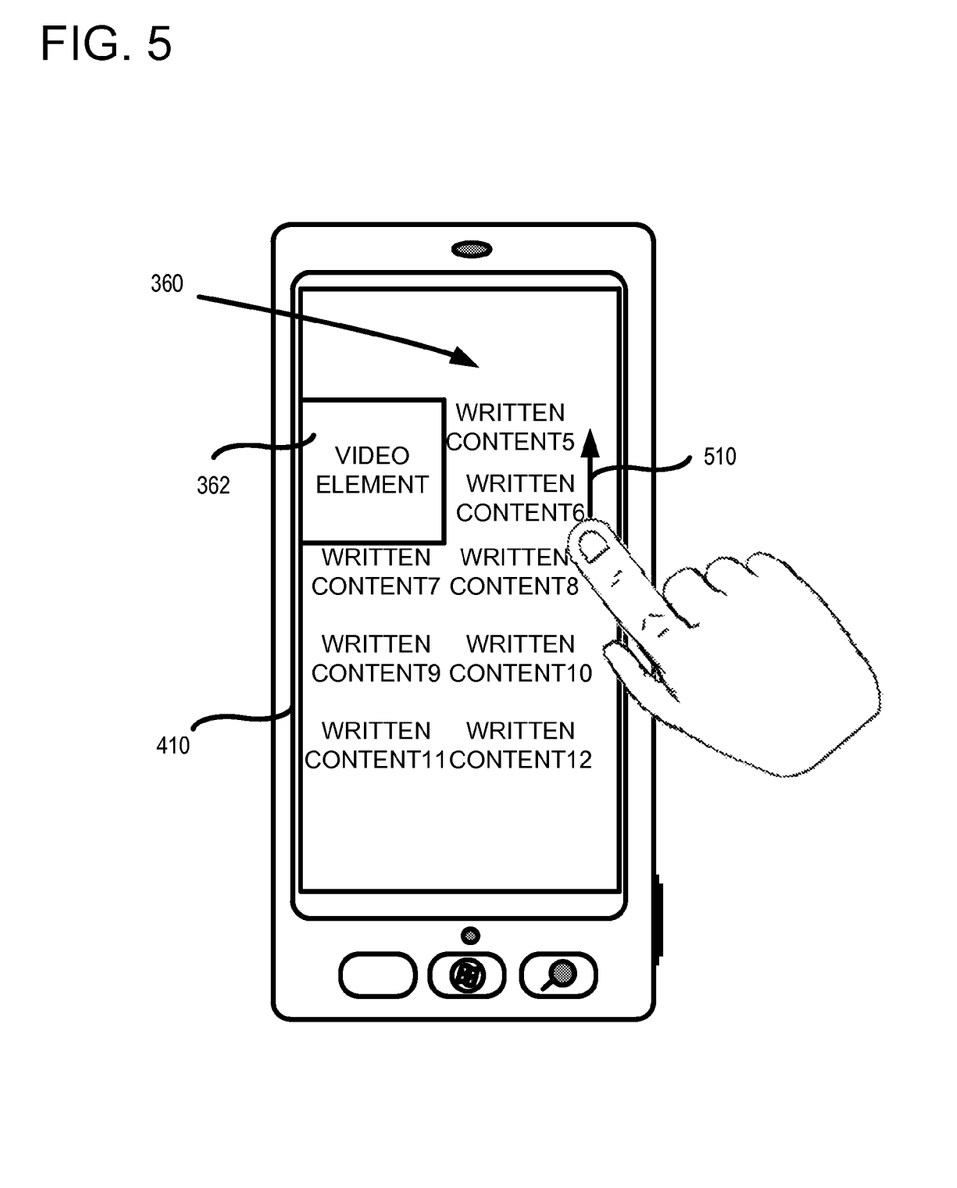
FIG. 5 shows the embodiment of FIG. 4 with content being scrolled while the video element remains at a fixed location.

FIG. 5 shows the written content 360 being scrolled as indicated by a finger flick in the direction of arrow 510. As seen, the written content 1 through written content 4 (from FIG. 4) scrolled off of a visible portion of the user interface and written content 8 through written content 12 scrolled onto the visible portion. Notably, the coordinates of the docked video element 362 did not change, as it is in the same relative position to the edge 410 of the browser page or the touch screen.

The video element 362 is generally a first-frame teaser that a user can select in order to play the associated video. When the video element is not playing, the browser engine can have control over both the video element 362 and the written content 360. In such a case, the browser engine is passed coordinates of the video element if it is moved by the user around the browser page to a new location. However, if the user selects the video element, the browser engine can selectively pass control of the video element to the media engine. The browser can pass the coordinates of the video element and a video element ID to the media engine. Once control is passed, the media engine and the UI renderer can communicate directly by passing frames from the media engine to the UI renderer without passing through the browser engine. Simultaneously, the browser engine can maintain control of other content, such as the written content 360. The user can move the video element to any desired location on the browser page and the browser engine, once passed the new coordinates of the video element, can reformat the page layout to account for the new position of the video element.

Although the video element of FIG. 5 is shown as docked to a left edge of the user interface, it can be docked at any location (i.e., top, bottom, right, and left). Additionally, the video element can handle gestures independent of the rest of the browser page. For example, the video element can be moved and resized. The browser page can then be automatically formatted and resized to account for the video element's new size or position. Typically, the browser page gets resized to take the remaining portion of the touch screen. The video can continue to play if it was playing prior to the gesture, such as the flick gesture. Once docked, the user can navigate to other parts of the page while watching the video. If the user stops playing the video, the browser can resume control of content being streamed to the UI renderer.

Figure 6:
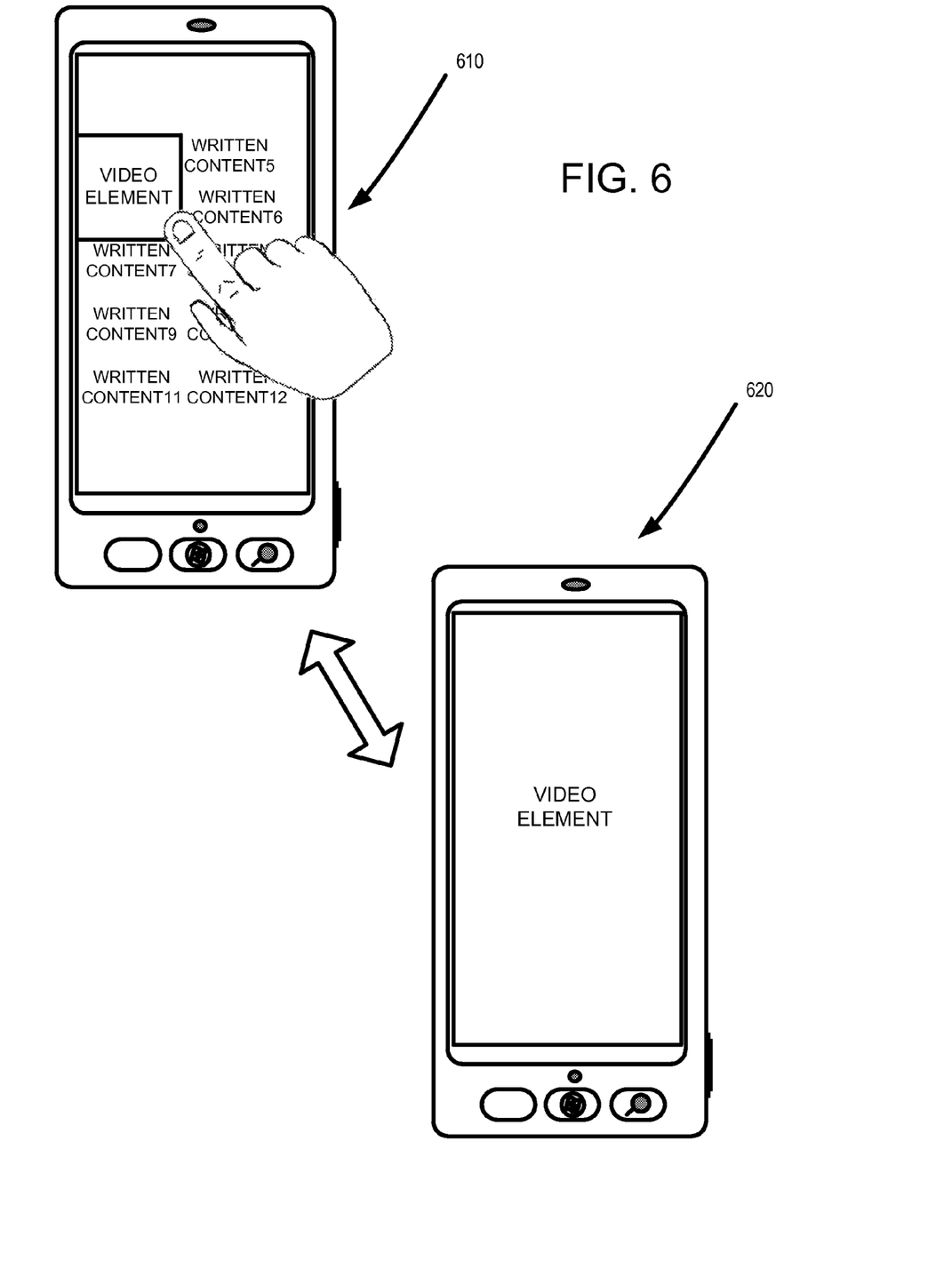
FIG. 6 is an embodiment switching a docked video element to a full-screen mode.

FIG. 6 is an embodiment wherein the video element is resized to a full-screen mode upon a double tap or other pre-designated user input command. In mode 610, the video element is less than full-screen mode and takes only a small portion of the browser page. Full-screen mode is shown at 620, wherein the video element takes the entire browser page, and no written content is displayed. When switched to full-screen mode, the browser engine can pass control of any streaming to the media engine. If both the browser engine and the media engine were providing parallel content streams, once full-screen mode is activated, the browser engine relinquishes full control to the media engine so that there is only one stream of content, which comes from the media engine.

Figure 7:
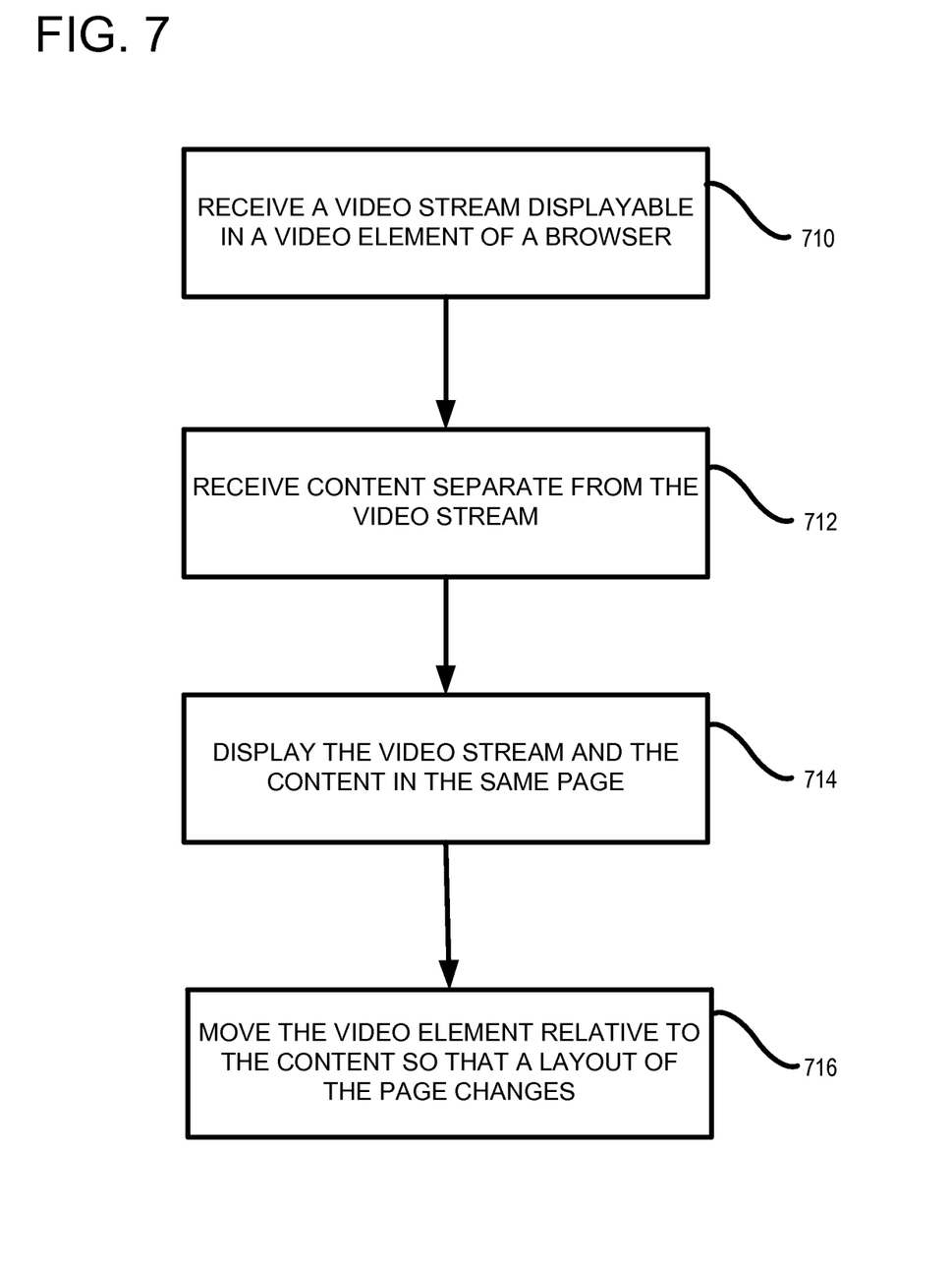
FIG. 7 is a flowchart of a method for streaming video in a browser.

FIG. 7 is a flowchart of a method for streaming video in a browser. In process block 710, a video stream is received that is displayable in a video element of a browser. The receiving is typically accomplished by a media engine located on the client device. When passed over a network, the video stream is generally encoded and the media engine can decode the video stream and pass the video frames to either a browser engine or a UI renderer. In process block 712, content is received that is separate from the video stream. For example, written content can be received. The content can also be decoded by the media engine and passed to a browser engine for display in a UI renderer. In process block 714, the video stream and the content are displayed in the same browser page. In mobile phones, the browser page can take up the full touch screen. In computers, the browser page can be within a single window. The video stream is displayed in the video element, while the other content is displayed on the remainder of the browser page by the renderer. To accomplish this, the renderer combines the content and the video on the same browser page. In process block 716, the video element can be moved relative to the content so that the layout of the page changes. The moving of the video element can be accomplished on a touch screen using a simple flick gesture or drag-and-drop gesture. On a computer, typically, moving of the video element is through a drag-and-drop operation. Once the video element is moved, the new coordinates of the video element on the user interface are passed to the source of the video content. Additionally, the browser engine receives the new coordinates and reformats the browser page so that the content can be displayed on the remainder of the page.

Figure 8:
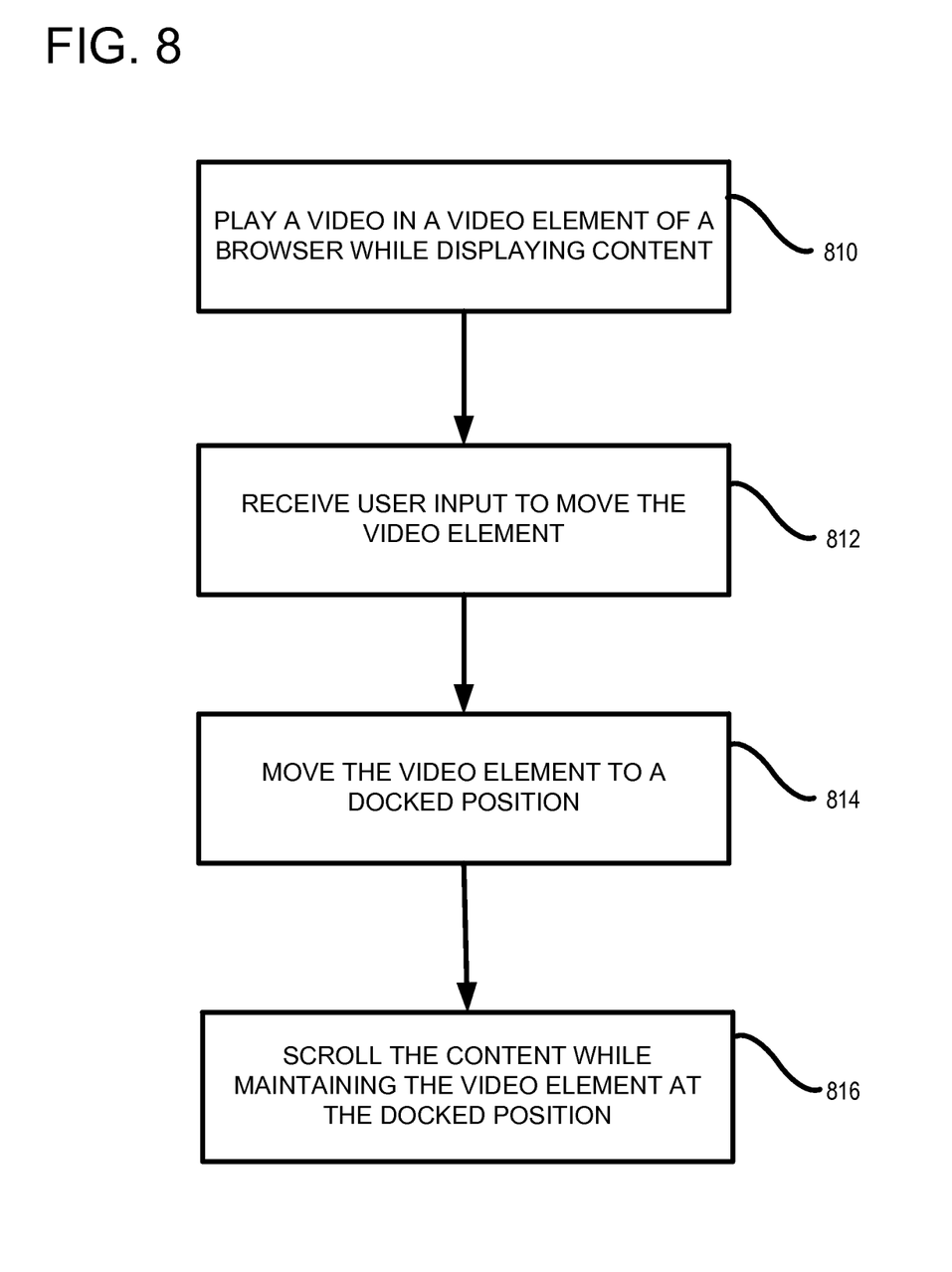
FIG. 8 is a flowchart of a method for docking a video element.

FIG. 8 is a flowchart of another embodiment of video streaming to a browser. In process block 810, a video is played in a video element while other content, independent of the video, is being displayed. In process block 812, user input is received to move the video element. Typically, a flick operation or drag-and-drop operation are performed. In process block 814, the video element automatically moves to a docked position based on the user input. In alternative embodiments, the video element can be moved to a different location without the need to dock the video element. In any event, the video element is then moved by changing the coordinates of the video element on the browser page so that the position of the video element relative to the other content is changed. If the video element coordinates are substantially adjacent an edge of the browser page, then the video element is considered docked. In process block 816, the content can be scrolled while the video element remains at the docked position. In this way, the video element remains in a visible area of the user interface and does not scroll out of view.

Figure 9:
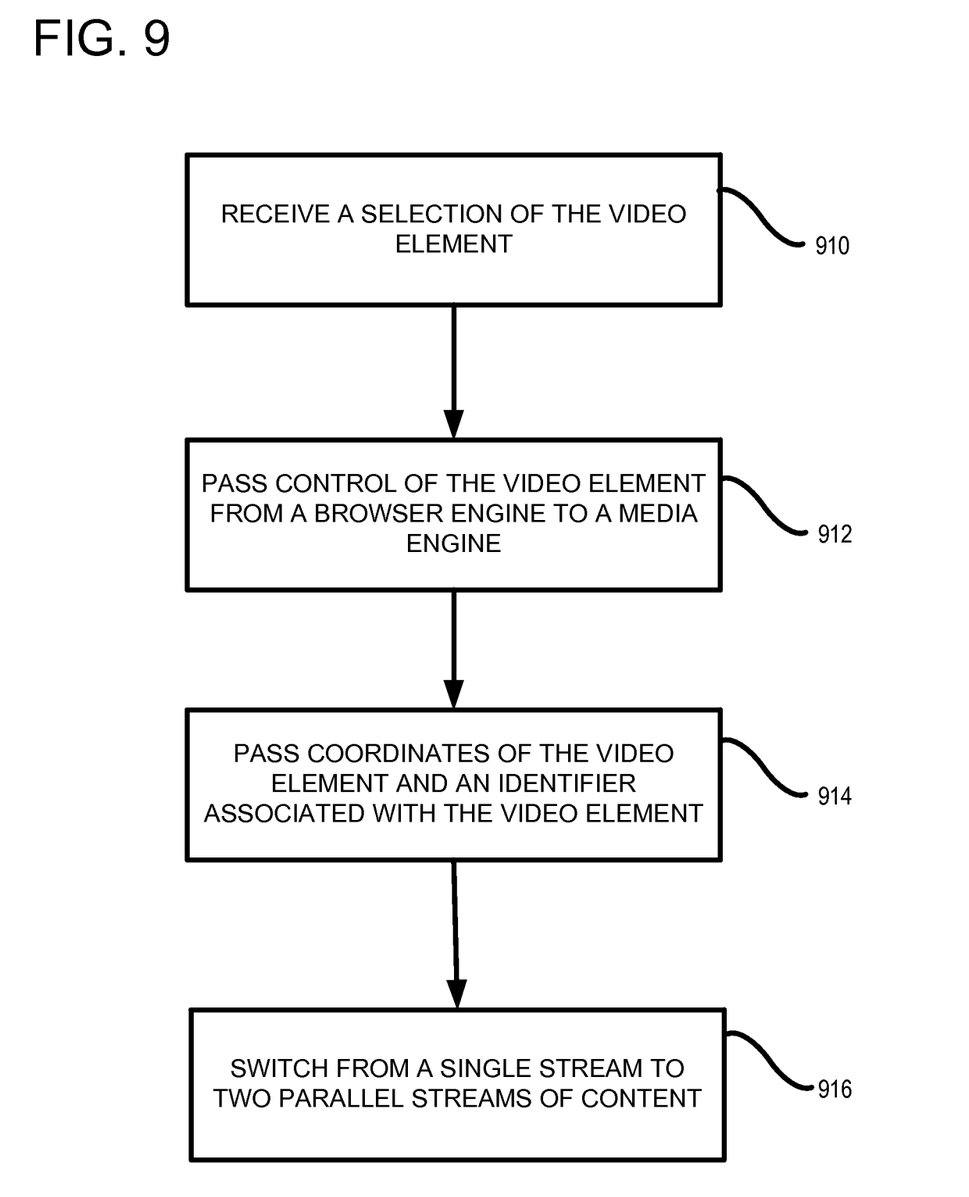
FIG. 9 is a flowchart showing how control of a video element can be passed from a browser engine to a media engine.

FIG. 9 is a flowchart of a method showing selection of the video element. In process block 910, a selection of the video element is received from the gesture engine. Typically, a user selection of the video element is accomplished by touching the video element, which indicates play of the video is desired. In process block 912, a browser engine passes control of the video element from the browser engine to the media engine. In process block 914, in passing control, the browser engine can pass coordinates of the video element to the media engine and the UI renderer. Additionally, a video element identifier can be passed to both the media engine and the UI renderer to facilitate direct communication there between. In process block 916, the UI renderer switches from receiving a single stream of content from the browser engine, to parallel streams of content from the browser engine and the media engine.

Figure 10:
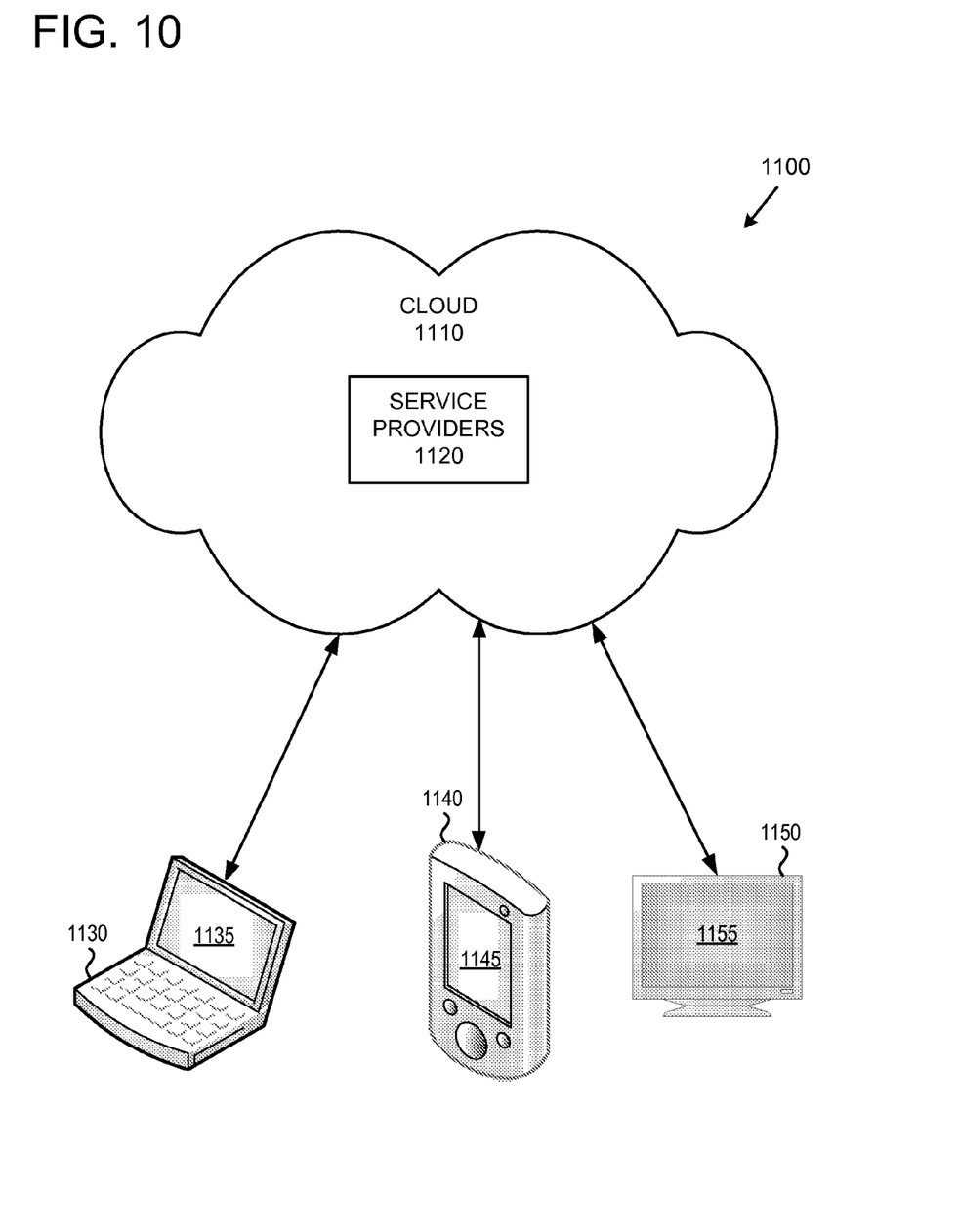
FIG. 10 is an embodiment showing that the dockable video element can used on different client platforms.

FIG. 10 illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer, such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, or the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Video streaming as described herein can occur on any of the devices 1130, 1140, 1150. The streaming video can be sourced by the cloud 1110 using well-known techniques.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A method of streaming video to a browser on a client device, comprising:
   receiving, from a media engine, a decoded video stream displayable in a video element of the browser on the client device;
   receiving content, separate from the decoded video stream, from a browser engine;
   combining the decoded video stream and the content using a renderer;
   displaying the decoded video stream and content in a same browser page using the renderer; and
   in response to user input, moving the video element relative to the content so that a layout of the browser page changes;
   wherein the browser engine has control of both of the video element and the content until a selection of the video element is received, and, in response to the selection, the browser engine passes control of the video element to the media engine for delivering the decoded video stream to the renderer.

2. The method of claim 1, further including docking the video element relative to an edge of the browser page.

3. The method of claim 2, further including scrolling the content, while the video element remains at a fixed location relative to an edge of the browser page.

4. The method of claim 1, further including passing position coordinates of the video element to a user interface renderer.

5. The method of claim 1, further including receiving an encoded video stream and the content from a network using a media engine on the client device, and further including decoding the encoded video stream and content using the media engine.

6. The method of claim 1, wherein the user input includes a drag-and-drop operation or a flick operation.

7. The method of claim 1, further including passing control of the video element from a browser engine to a media engine upon selection of the video element.

8. The method of claim 7, wherein passing control includes passing a video element identifier from the browser engine to the media engine and passing the video element identifier from the browser engine to a renderer.

9. The method of claim 1, further including receiving user input selecting the video element while the decoded video stream is playing and switching to a full-screen mode wherein only the decoded video stream from the media engine is rendered.

10. The method of claim 1, wherein the layout of the page changing includes reformatting the content to account for movement of the video element.

11. The method of claim 10, wherein reformatting includes resizing the content.

12. A computer-readable storage component having instructions thereon for implementing a method, comprising:
   playing a video in a video element of a browser while displaying written content outside of the video element;
   receiving user input to move the video element;
   in response to the user input, moving the video element to a docked position; and
   scrolling the written content, while maintaining the video element in the docked position, which is a fixed position relative to an edge of a user interface, wherein both the written content and the video element are controlled by a browser engine;
   receiving a user selection of the video element;
   in response to the user selection, passing coordinates of the video element from the browser engine to a media engine;
   wherein the video is sourced from the media engine and the written content is sourced from the browser engine, so that a renderer displaying the video and written content simultaneously receives the video and written content in parallel streams and displays the video and written content in a single browser page.

13. The computer-readable storage component of claim 12, further including reformatting the written content to account for a change in position of the video element relative to the written content as the written content is scrolled.

14. The computer-readable storage component of claim 12, wherein the browser is located on a mobile phone and the video and the written content are displayed in a single browser page.

15. The computer-readable storage component of claim 12, wherein the received user input is a flick operation or a drag-and-drop operation.

16. A method, comprising:
   playing a video in a video element of a browser while displaying written content outside of the video element;
   receiving user input to move the video element;
   in response to the user input, moving the video element to a docked position; and
   scrolling the written content, while maintaining the video element in the docked position, which is a fixed position relative to an edge of a user interface, wherein both the written content and the video element are controlled by a browser engine;
   receiving a user selection of the video element;
   in response to the user selection, passing coordinates of the video element from the browser engine to a media engine;
   wherein the video is sourced from the media engine and the written content is sourced from the browser engine, so that a renderer displaying the video and written content simultaneously receives the video and written content in parallel streams and displays the video and written content in a single browser page.

17. The method of claim 16, further comprising reformatting the written content to account for a change in position of the video element relative to the written content as the written content is scrolled.

18. The method of claim 16, wherein the browser is located on a mobile phone and the video and the written content are displayed in a single browser page.

19. The method of claim 16, wherein the received user input is a flick operation or a drag-and-drop operation.

* * * * *